United States Patent [19]

Zertuche

[11] Patent Number: 4,655,987
[45] Date of Patent: Apr. 7, 1987

[54] METHOD AND APPARATUS FOR EXTRUDING TUBULAR ARTICLES HAVING SEVERAL CONDUITS

[76] Inventor: Guillermo Zertuche, 161 Av. Mazatlan, Mexico D. F., Mexico

[21] Appl. No.: 433,713

[22] Filed: Oct. 12, 1982

[51] Int. Cl.$^4$ ............................................. B29C 47/26
[52] U.S. Cl. ....................... 264/563; 264/209.1; 264/209.8; 425/192 R; 425/326.1; 425/467
[58] Field of Search ............ 264/566, 560, 565, 209.8, 264/45.9, 173, 150, 149, 209.1, 17, 7 R, 563; 425/72 R, 133.1, 326.1, 192 R, 380, 461–467; 65/86, 88

[56] References Cited

U.S. PATENT DOCUMENTS

| | | | |
|---|---|---|---|
| 353,681 | 12/1886 | Hurlbut | 425/467 |
| 1,468,535 | 9/1923 | Laskey | 425/464 |
| 3,061,873 | 11/1962 | Brown | 425/380 |
| 3,229,005 | 1/1966 | Reifenhauser | 264/46.1 |
| 3,241,503 | 3/1966 | Schafer | 425/133.1 |
| 3,357,051 | 12/1967 | Zolotarevsky | 425/192 R |
| 3,402,682 | 9/1968 | Peden et al. | 425/380 |
| 3,467,570 | 9/1969 | Baxter et al. | 425/192 R |
| 3,520,963 | 7/1970 | Allseits et al. | 264/173 |
| 3,664,794 | 5/1972 | Wilton | 425/192 R |
| 3,792,951 | 2/1974 | Meyers | 425/467 |
| 3,825,641 | 7/1974 | Barnett | 264/565 |
| 3,899,276 | 8/1975 | Sokolow | 425/380 |
| 4,045,154 | 8/1977 | Ratheiser | 425/467 |
| 4,061,461 | 12/1977 | Hessenthaler | 425/462 |
| 4,113,814 | 9/1978 | Kojimoto et al. | 264/89 |
| 4,118,162 | 10/1978 | Baumgarten | 425/113 |
| 4,118,456 | 10/1978 | Blanding et al. | 264/209.8 |
| 4,133,623 | 1/1979 | Bevan et al. | 425/133.1 |
| 4,161,379 | 7/1979 | Sudyk | 425/112 |
| 4,163,640 | 8/1979 | Higuchi et al. | 425/197 |
| 4,182,603 | 1/1980 | Knittel | 425/133.1 |
| 4,240,782 | 12/1980 | McPhee et al. | 425/467 |
| 4,290,743 | 9/1981 | Suzuki | 264/209.8 |
| 4,298,564 | 10/1981 | Higuchi et al. | 425/199 |
| 4,305,703 | 12/1981 | Lupke et al. | 425/72 |
| 4,323,339 | 4/1982 | de Kok et al. | 425/199 |
| 4,371,326 | 2/1983 | McAlister | 425/463 |

FOREIGN PATENT DOCUMENTS 45-34273  11/1970  Japan ................................. 425/467

*Primary Examiner*—Jeffery Thurlow
*Attorney, Agent, or Firm*—Ladas & Parry

[57] ABSTRACT

The invention relates to the manner of extruding multi-conduit pipes. A novel nozzle and a related method are disclosed whereby the extrusion of a pipe having multiple inner lengthwise subdivisions is made possible.

4 Claims, 8 Drawing Figures

METHOD AND APPARATUS FOR EXTRUDING TUBULAR ARTICLES HAVING SEVERAL CONDUITS

BACKGROUND OF THE INVENTION

In the field of plastics, it has become desirable to produce internally subdivided tubular bodies and the like. One application in industry would be that of providing reinforcing tubing that will withstand loads and heavy duty work. Another application is that of providing several inner conduits for housing electrical wires, pumping diverse fluids therethrough, etc. Manufacturing of such types of tubing has not been possible given the present state of the art in nozzles. In this regard, Kojimoto et al's U.S. Pat. No. 4,113,841 discloses a method for producing a preferably thermoplastic tubular body longitudinally partitioned by a diaphragm into two conduits.

This method does not precede the invention being disclosed herein, since Kojimoto's tubular body is partitioned by a separate strip to form said diaphragm. Also my invention relates to continuous and uninterrupted inner conduits which maintain the same proportion to one another throughout the complete extrusion of the pipe.

SUMMARY OF THE INVENTION

The invention primarily relates to the continuous extrusion of one-piece tubular articles having inner cell-like divisions. The system disclosed herein sets forth the manner in which the extrusion material is force-fed about the inner and outer walls of a nozzle to provide for said cell-like divisions. It has been found that given the nature of the nozzle, various materials can be so shaped provided that said nozzle is preadapted to the pertinent machinery. It should prove useful for all types of plastic materials and may be used for extruding crystal pipes. Although trial runs have been limited to the aforesaid materials, it is contemplated that aluminum may also be extruded in a similar manner when certain necessary operating conditions are met such as temperature-in the nozzle and die-length of the nozzle, temperature and pressure of the air or gas being fed to the newly formed chambers or conduits of the article being extruded, etc. The object of this invention, then, is that of providing a system whereby any cross-section shape can be extruded in a continuous manner.

It is another object to facilitate the extrusion of various materials in any desired shape.

Another object still is a nozzle having the means for combining differently shaped components and thereby produce any desired combination of inner walls or conduits.

Another object is a nozzle that can readily be assembled and disassembled for cleaning and maintenance as well as for combining different shapes.

The invention, as disclosed herein, relates to extruding tubing in general but will be further detailed only as regards a modality thereof for the sake of clarity. It should not, however, be construed as a limitation thereof.

DETAILED DESCRIPTION OF THE INVENTION

Figures 1, 2:
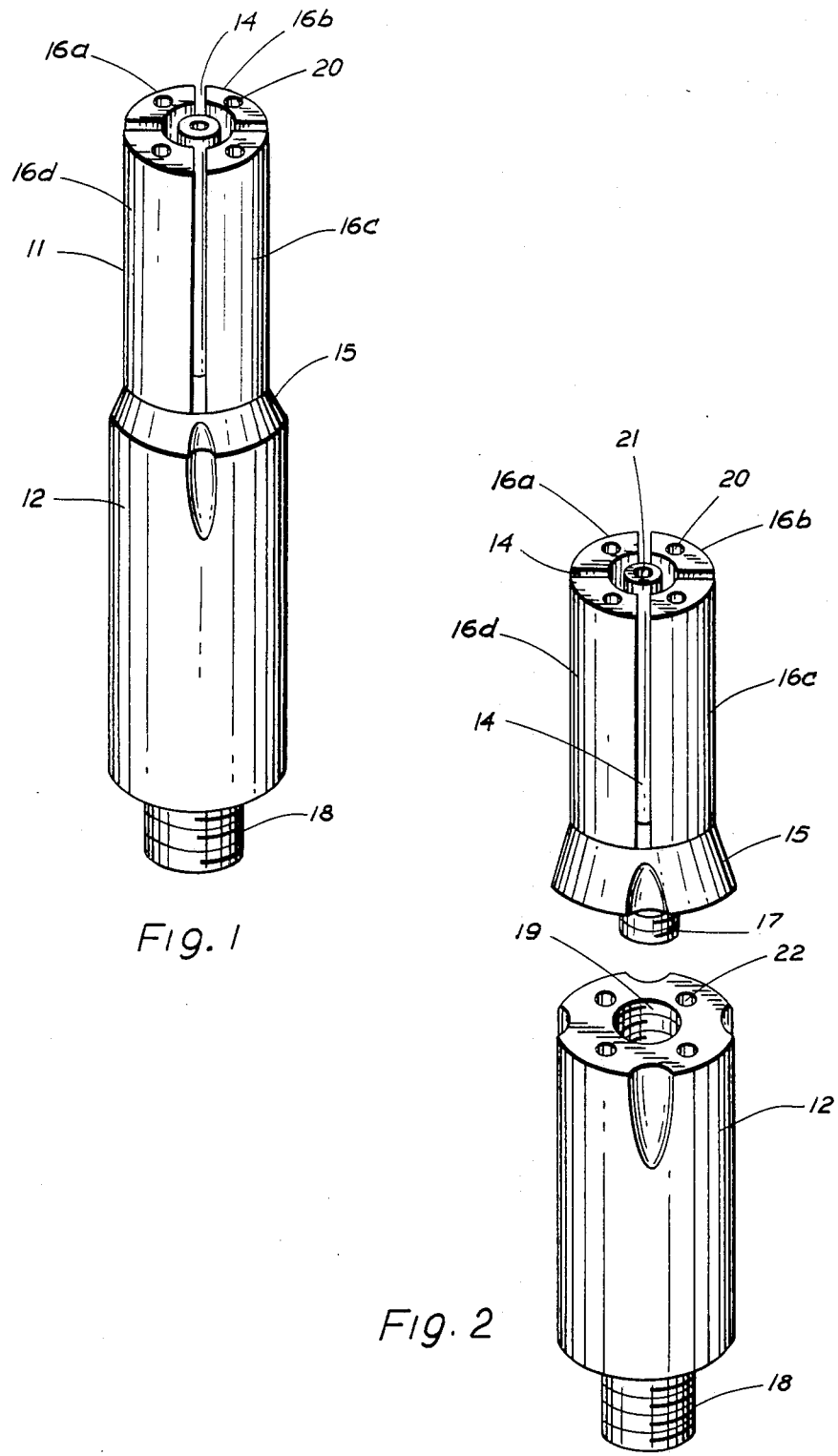
FIG. 1 is a perspective view of the nozzle.
FIG. 2 is a perspective view of the nozzle separated in two parts.

Provision is made for supplying, through different paths, both suitably heated material and air to the nozzle end of an extruder. The material advances sandwiched between an inner core or stem 12 and an enclosing outer wall of a die. The enclosing wall gradually closes on said core, which forms a base for the nozzle end. On reaching the nozzle end, said outer wall closes on the nozzle, thereby considerably reducing the gap therebetween to a clearance which is to remain practically unaltered thereafter and will thus define the thickness of the outer wall of the extruded pipe. The extrusion materials slides pressure-fed into the inner recesses 14 of the nozzle and continues to advance while thoroughly being shaped by said nozzle 11. Nozzle 11 comprises stem 12, base 15 and a multipartitioned core 16 comprising recesses 14. Base 15 comprises a lower threaded portion 17 for securing said base to stem 12. Said stem 12 comprises threaded projection 18 for coupling with the back wall of the spider (not shown).

Stem 12 has an inner air conduit 19 which connects to inner conduits 20 of said core partitions 16a, b, c, d, through corresponding bores 22 or through an air distribution chamber. Central tubular partition 21 may, as well, receive air directly from conduit 19 or from said air distribution chamber.

Figure 3:
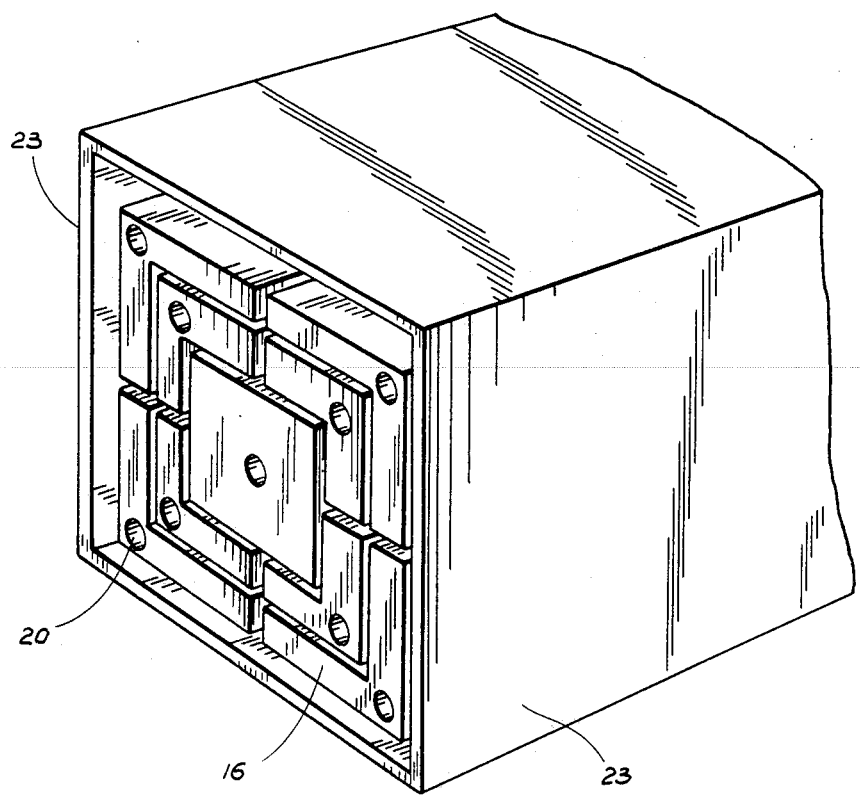
FIG. 3 is a perspective view of another possible nozzle shape within an outer die.
Figure 4:
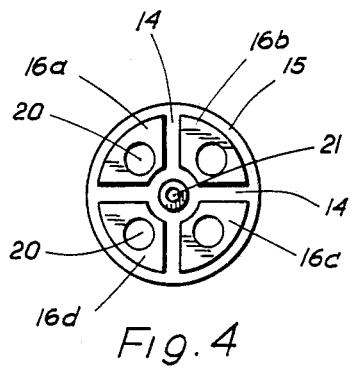
FIG. 4 is an upper plan view of the nozzle shown at FIGS. 1 and 2.
Figure 5:
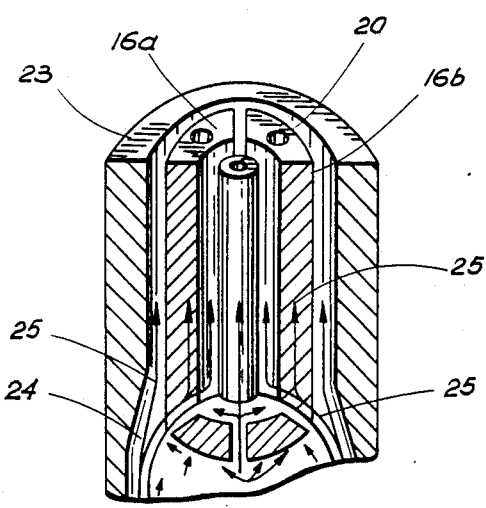
FIG. 5 shows the nozzle with some parts removed in order to illustrate distribution of the extrusion material in its recesses.

Die 23 closes on said nozzle at 24 to force the fluid material 25 into entering recesses or passages 14, all of which are interconnected to actually form one single variously-shaped or composite recess which shapes the advancing material 25 to the final extruded form. When the already shaped material goes out the nozzle and die (FIG. 3 or 5), air flowing out of conduits 20 provides any air pressure and/or temperature desired for the extruded material.

Figure 6:
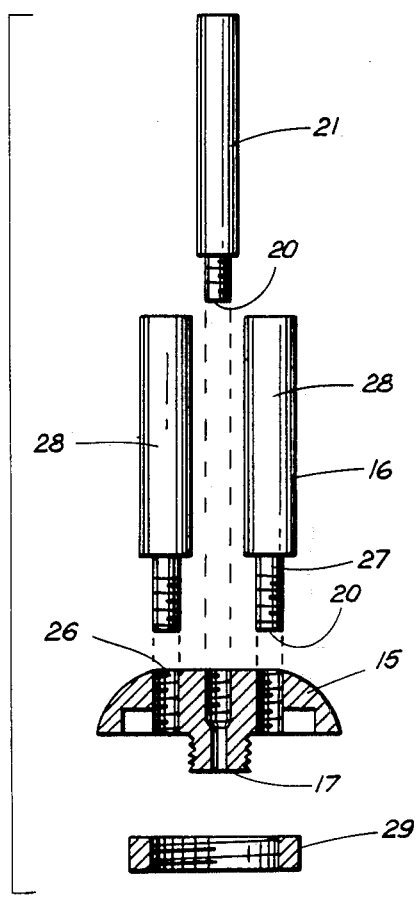
FIG. 6 is an exploded view of a nozzle.
Figure 7:
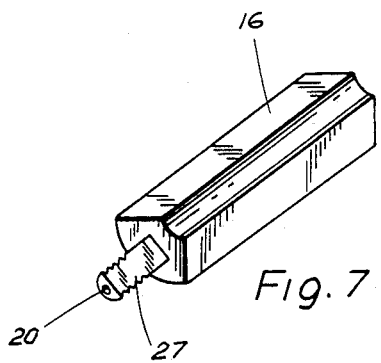
FIG. 7 is a perspective view of a nozzle component.
Figure 8:
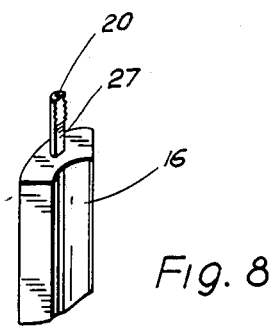
FIG. 8 is a lower perspective view of a nozzle component.

Nozzle 11 can be a solid one-piece structure or else constitute an assembly of various parts as shown in FIG. 6. In this figure, base 15 has suitable bores for receiving the threaded projections 27 of partitions 28. Said threaded projections 27 form an outer thread for coupling with nut 29, thereby securing the complete set. Whenever there is a central partition, such as the one shown in the drawings, it may preferably be screwed directly into base 15.

I claim:

1. A method of extruding a continuous multi-conduit tubular shape having an outer wall and inner walls forming separate conduits, which comprises: feeding extrudable material in a fluid state under suitable pressure through a confining die into a nozzle comprising a core located within said confining die and having a plurality of interconnected recesses; supplying air or other gas under ambient pressure to inner conduits in said core; forcing said extrudable material into said recesses so as to shape thereby a continuous flow of material into a multi-conduit pipe, said die closing in on said nozzle core at a base end thereof so as to form a considerably reduced gap therebetween whereby the material is forced into said recesses, said material adopting the shape of said interconnecting recesses so as to define thereby the inner conduits of the extruded tubular shape and said confining die and core defining the outer wall terminal with said inner walls; and extruding said shaped material as a continuous multiconduit tubular shape with integral outer wall and inner walls.

2. A method according to claim 1, wherein means for supplying air or other gas comprises an air distribution chamber to provide said air or other gas at uniform pressure from a single source to each of said recesses.

3. A nozzle comprising an outer confining die; a nozzle core which comprises separately made parts which can be assembled into final form and disassembled for cleaning purposes, whereby said nozzle core may be assembled together combining variously-shaped parts for extruding tubular shapes having any desired inner and outer shape and wall thickness, said nozzle core having inner recesses forming one variously-shaped chamber for receiving extrudable material in a fluid state, said recesses extending parallel to one another throughout the nozzle, said recesses defining inner walls of an integral tubular shape, and said nozzle core further having inner conduits for passage of air or other gas, said confining die closing in on said nozzle core at a base end thereof forming a considerably reduced gap therebetween so as to force the extrudable material into said recesses; and means for supplying air or other gas under ambient pressure to said inner conduits in said core.

4. A nozzle according to claim 3, wherein said means for supplying air or other gas comprises an air distribution chamber to provide said air or other gas at uniform pressure from a single source to each of said inner conduits in said core.

* * * * *